United States Patent
Zaibel et al.

(12) 
(10) Patent No.: US 10,755,478 B1
(45) Date of Patent: Aug. 25, 2020

(54) SYSTEM AND METHOD FOR PRECISION INDOORS LOCALIZATION AND MAPPING

(71) Applicant: OKIBO LTD., Petach Tikva (IL)

(72) Inventors: Lior Zaibel, Moshav Ashalim (IL); Guy German, Magal (IL)

(*) Notice: Subject to any disclaimer, the term of this patent is extended or adjusted under 35 U.S.C. 154(b) by 0 days.

(21) Appl. No.: 16/798,450

(22) Filed: Feb. 24, 2020

Related U.S. Application Data

(60) Provisional application No. 62/912,072, filed on Oct. 8, 2019.

(51) Int. Cl.
*G06T 17/05* (2011.01)
*G06T 17/20* (2006.01)
*G05D 1/00* (2006.01)

(52) U.S. Cl.
CPC ........... *G06T 17/05* (2013.01); *G05D 1/0088* (2013.01); *G06T 17/20* (2013.01); *G05D 2201/0207* (2013.01); *G06T 2210/04* (2013.01)

(58) Field of Classification Search
None
See application file for complete search history.

(56) References Cited

U.S. PATENT DOCUMENTS

| | | | |
|---|---|---|---|
| 6,683,977 B1* | 1/2004 | Albrecht | G06T 7/55 356/12 |
| 9,777,491 B2 | 10/2017 | Grivetti et al. | |
| 9,998,931 B2 | 6/2018 | Dow et al. | |
| 10,272,613 B2 | 4/2019 | Boyd, IV | |
| 2007/0138678 A1 | 6/2007 | Khoshnevis | |
| 2015/0362565 A1* | 12/2015 | Sanfilippo | G01R 33/0005 324/251 |
| 2016/0185047 A1* | 6/2016 | Windau | G01B 11/002 358/406 |
| 2017/0160869 A1* | 6/2017 | Tang | G06T 7/90 |
| 2018/0071949 A1 | 3/2018 | Giles | |
| 2019/0087842 A1* | 3/2019 | Koenig | G06Q 30/0209 |

FOREIGN PATENT DOCUMENTS

| | | |
|---|---|---|
| CN | 106827168 B | 5/2019 |
| WO | 2017075961 A1 | 5/2017 |

* cited by examiner

*Primary Examiner* — Tung S Lau

(57) ABSTRACT

A method of mapping an interior of a building and/or a device for mapping and/or construction of an interior of a building is disclosed. For example, an autonomous device may find a reference point in a building and/or build an accurate 3D model of the space and/or the building. For example, while mapping the building, the device may use 3D features to orient itself and/or define reference points. For example, a corner where three surfaces meet may serve as a reference point. In some embodiments, the device starts from a starting point (optionally the starting point is arbitrary) and/or finds a defined reference point. For example, the device may include a self-mobile device (e.g. a robot) including a 3D sensor (for example a depth camera and/or 3D Lidar). Optionally the system may include a high precision robotic arm.

20 Claims, 11 Drawing Sheets

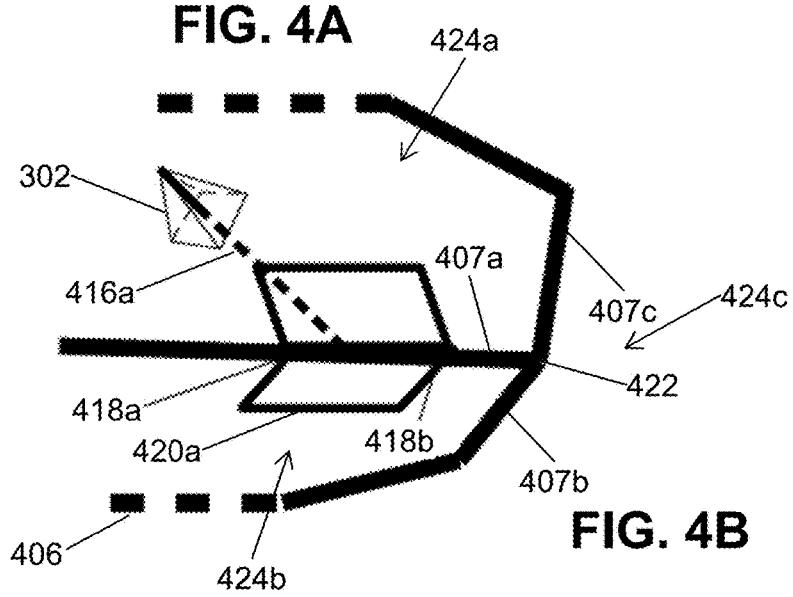
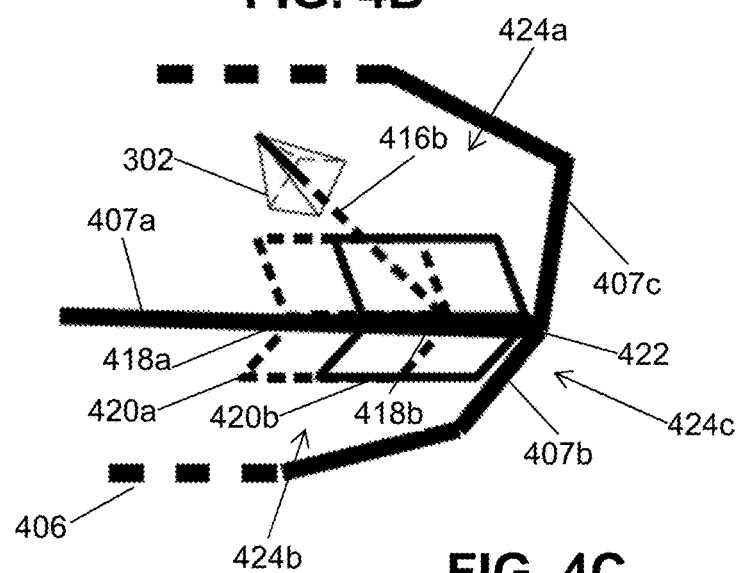
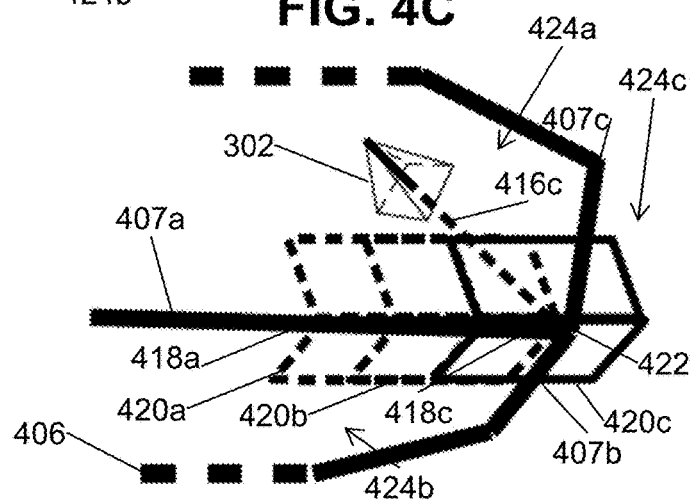

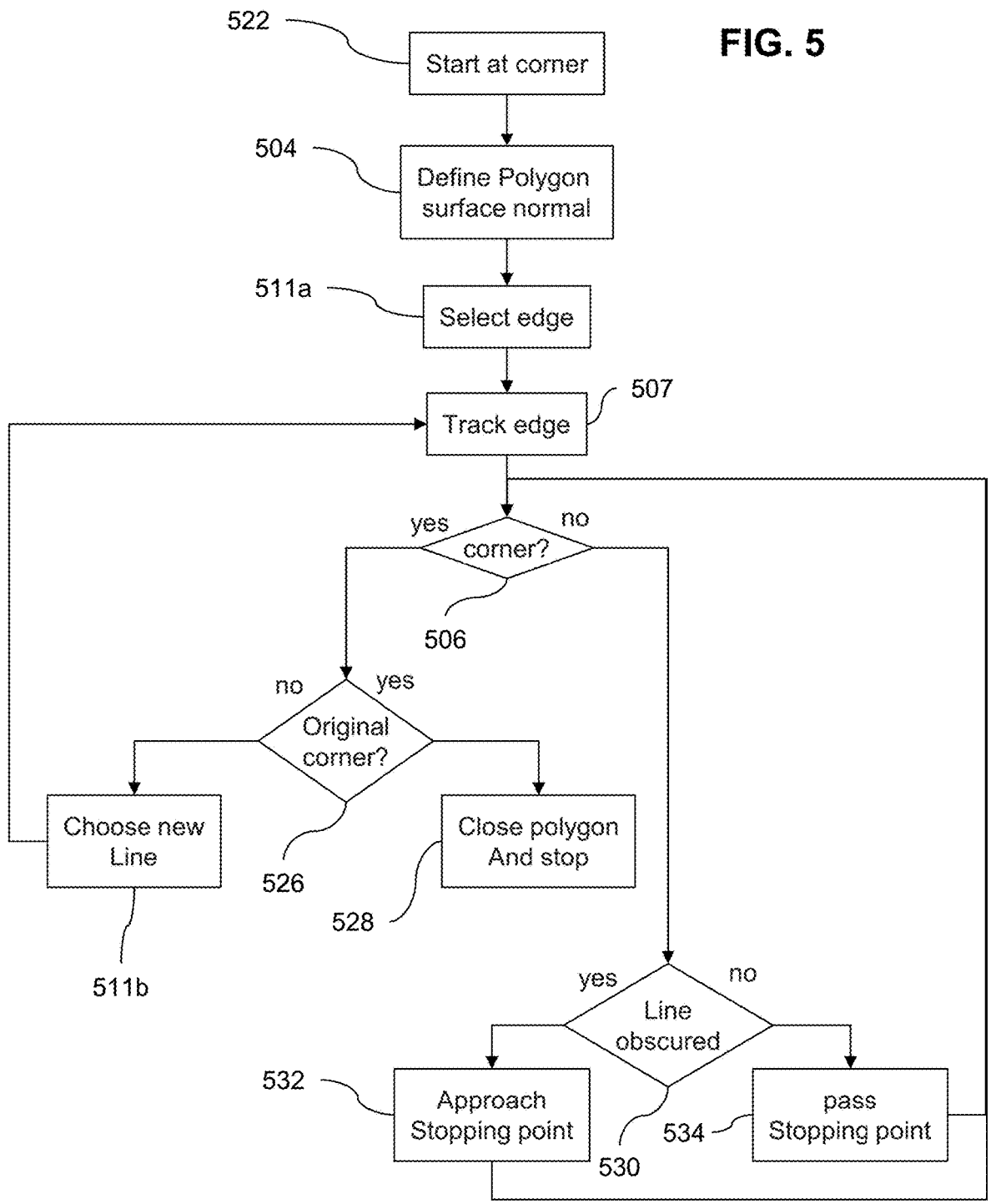

SYSTEM AND METHOD FOR PRECISION INDOORS LOCALIZATION AND MAPPING

RELATED APPLICATION/S

This application claims the benefit of priority under 35 USC § 119(e) of U.S. Provisional Patent Application No. 62/912,072 filed 8 Oct. 2019, the contents of which are incorporated herein by reference in their entirety.

FIELD AND BACKGROUND OF THE INVENTION

The present invention in some embodiments thereof relates to the technical field of localization of a device and/or mapping and more specifically but not exclusively to localization and/or mapping of an interior of a building.

SUMMARY OF THE INVENTION

According to an aspect of some embodiments of the invention, there is provided a method of mapping a space including: taking a snapshot in a field of view of a 3D sensor assembly; identifying in the snapshot a first surface; searching for a corner wherein the first surface makes a junction with at least a second surface and a third surface; mapping the rest of the space in relation to the corner.

According to some embodiments of the invention, the first surface includes a plane fit to a physical surface at a first location.

According to some embodiments of the invention, the second surface and the third surface each includes a plane fit to a physical surface at another location.

According to some embodiments of the invention, the method further includes: meshing the snapshot.

According to some embodiments of the invention, taking the snapshot includes collecting a 3D point cloud within the field of view.

According to some embodiments of the invention, the searching for a corner includes: finding a second surface; defining an edge where the first surface meets the second surface and following the edge to the corner.

According to some embodiments of the invention, the finding an edge includes: tracking along the first surface in a fixed direction until stop condition is encountered and testing if a stop location is an edge.

According to some embodiments of the invention, the method where the following the edge to a corner includes: following the edge until a stop location at which the edge intersects another surface and recognizing the corner where three surfaces meet in a snap shot including the stop location.

According to some embodiments of the invention, when the stop location is not a meeting of three edges the method further includes: continue to follow the edge past the stop location and taking new snap shot of the stop location from an opposite side thereof.

According to some embodiments of the invention, when the stop location is not a meeting of three edges the method further includes: approaching but not passing the stop location along the edge and taking a and new snap shot of the stop location.

According to some embodiments of the invention, the first surface is a plane and the stop condition includes the plane intersecting another surface.

According to some embodiments of the invention, the testing includes finding a line on the edge intersects another fit surface.

According to some embodiments of the invention, the line is constrained to be straight.

According to some embodiments of the invention, the method further includes: closing perimeter of the first surface.

According to some embodiments of the invention, the closing includes: follow sequential edges of the first surface to return to a previous location.

According to some embodiments of the invention, the closing includes: repeatedly following a straight edge to a corner and follow new edge from the corner until a previous location is reached.

According to some embodiments of the invention, the 3D sensor is mounted on a mobile platform configured for navigating inside space, the method further including passing the mobile platform through a doorway.

According to some embodiments of the invention, the method further includes: traversing with the mobile platform along a rough surface and avoiding an obstacle.

According to some embodiments of the invention, the mobile platform includes a robotic arm including a movement tolerance of less than 0.25 mm and a reach of at least 3 m the method further including: moving the 3D sensor with the robotic arm while the mobile platform remains stationary.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g. the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4A is a schematic illustration of a stage in a method of finding a corner of a surface in accordance with an embodiment of the current invention;

FIG. 4B is a schematic illustration of a subsequent stage in a method of finding a corner of a surface in accordance with an embodiment of the current invention;

FIG. 4C is a schematic illustration of finding a corner of a surface in accordance with an embodiment of the current invention;

FIG. 5 is a flow chart illustration of a method of defining a polygon in accordance with an embodiment of the current invention;

DESCRIPTION OF SPECIFIC EMBODIMENTS OF THE INVENTION

Figure 1:
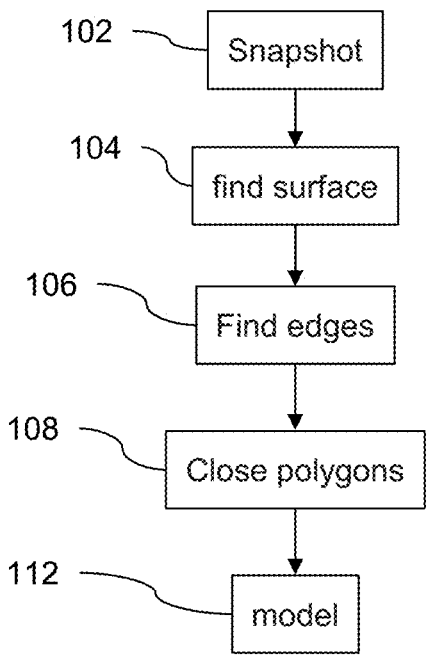
FIG. 1 is a flow chart illustration of a method of scanning an indoor area in accordance with an embodiment of the current invention.

The present invention in some embodiments thereof relates to the technical field of localization of a device and/or mapping and more specifically but not exclusively to localization and/or mapping of an interior of a building.

Overview

An aspect of some embodiments of the current invention relates to a method of mapping an interior of a building. For example, an autonomous device may find a reference point in a building and/or build an accurate 3D model of the space and/or the building. For example, while mapping the building, the device may use 3D features to orient itself and/or define reference points. For example, a corner where three surfaces meet may serve as a reference point. In some embodiments, the device starts from a starting point (optionally the starting point is arbitrary) and/or finds a fixed reference point. For example, the device follows a surface (optionally the device may seek an approximately planar surface) to an edge thereof. Optionally, the device may then follow the edge to a corner. For example, the corner may serve as a reference point. In some embodiments, the device may define surfaces and/or the edges of surfaces of the domain. Optionally, the device selects and/or defines approximately planar surfaces. Additionally or alternatively, the device may define a perimeter of a surface. For example, a plane may be bounded by other planes and/or its perimeter may be a polygon. Alternatively or additionally, the device is configured to define architectural objects such as wall, ceilings, floors, pillars, door frames, window frames. Optionally, a meshing surface and/or features are defined during scanning. For example, positioning of the scanner and/or the region scanned is controlled based on a mesh and/or a model of the domain built during the scanning process. Optionally, the method performs on the fly meshing of a single frame point-cloud and integrates the results with motion of the sensor.

In some embodiments, a surface may be defined and/or tested using a fitting algorithm and/or a quality of fit algorithm. For example, a planar physical surface may be detected and/or defined by fitting a plane to a surface and/or measuring a quality of fit of a plane to the physical surface. For example, a best fit plane to the physical surface may be defined and/or a root mean squared RMS error of the fit plane to the physical surface. Alternatively or additionally, a more complex shape, for example a curve may be fit to the physical surface. Edges and corners may optionally be defined based on the fit surface and/or on fitting the joints between surfaces. For example, a stop location and/or an edge and/or corner may be defined as the intersection between two and/or three and/or more virtual surfaces (e.g. planes or other idealized surfaces) fit to one or more physical surfaces. In some cases, the defined edge may not exactly correlate to an edge of the physical surface. In some cases, position of an edge and/or corner may be defined in a location where measuring a physical edge is inhibited (e.g. where the edge and/or corner is obscured and/or not sharp) Alternatively or additionally, a surface and/or plane may be defined by a vector (e.g. a normal) and/or changes in the normal over space.

An aspect of some embodiments, relates to an autonomous system for mapping indoor spaces. For example, the device may include a self-mobile device (e.g. a robot) including a 3D sensor (for example a depth camera and/or 3D Lidar). For example, the sensor will be used to define a one or more 3D reference points and/or objects. Various features of the space are optionally defined by their spatial relation to the reference points and/or objects. Optionally the system may include a high precision robotic arm. For example, the arm may facilitate precise movements of a sensor and/or a point of view. High precision sensor movements may facilitate high precision 3D scanning of the space. Alternatively or additionally, movement of the sensor may be imprecise and/or precise positioning may be determined from measurements and/or relations between measured objects.

An aspect of some embodiments of the current invention relates to a system and/or method for mapping a domain and/or for precision coordinated action in the domain. In some embodiments, the system relies on plane detection and/or 3D features of the room to performs real-time registration between consecutive point clouds. For example, in some embodiments, a mobile platform may be active in a domain and/or may need to map the domain and/or to perform functions in precisely defined locations. In some embodiments, sensing and/or controlling locomotion of the platform at high enough precision for example using Simultaneous Localization and Mapping SLAM may be exceedingly difficult. In some embodiments, a position measuring and/or mapping device is mounted to the platform on a high precision actuator. For example, the high precision actuator may include an industrial robotic arm and/or Pan and Tilt Unit. Optionally, actuator movement of the measuring device in relation to the platform and/or relative to previous positions is used to sense and/or control position at a higher level of precision than movement of the platform and/or of the mapping device. Optionally, before moving the platform for example, while the platform remains stationary, the measuring device will scan the area accessible to the actuator from the position at which the platform is located. Subsequently, the scan results may optionally be used to position the platform and/or the actuator and/or another device. For example, after the platform moves to a new location, the position measuring device may be used to determine the precise new location of the platform and/or the actuator. Optionally, the mapping may continue at high precision and/or a tool may be mounted on the arm and/or perform functions at a high level of precision. In some embodiments, the mapping and/or functions will be carried in an interior domain of a building. For example, the actions may include construction and/or interior finishing of the building. Optionally, the beginning location of the platform and/or arm will be chosen in relation to a corner of an interior space, as a localization artifact.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flow chart illustration of a method of scanning an indoor area in accordance with an embodiment of the current invention. In some embodiments, a device will begin mapping a domain by taking a snapshot 102 of field of view (FOV) of a sensor assembly in the domain. For example, the snapshot 102 may be an image the field. For example, the image may be made up of point measurements distributed over the FOV. For example, each point measurement may include a 3D coordinate and/or a light level and/or a color (e.g. a level of red, green and/or blue).

In some embodiments, device will optionally find 104 a surface in the snapshot. For example, the device may find 104 a planar surface. Note that a curved surface and/or an uneven surface may be defined as planar over some small area and/or approximately planar over a large area. For example, the surface may be defined as planar over a domain where an angle of a normal to the surface does not change more than 1% and/or 5% and/or 10% and/or 30%. For example, the surface may be defined as planar in an area where a difference between the location of the surface and a plane is less than 1/20 of the length of the surface and/or less than 1/10 the length and/or less than 1/5 the length. Unless otherwise stated, a surface may be defined as a plane when a difference (e.g. RMS difference) is less than a threshold. Optionally, the fitting test (e.g. the threshold) may be fixed and/or range dependent. For example, for some sensor types the test may be range dependent and/or for other sensors it may be fixed). Optionally the device will build a mesh of one or more surfaces in the snapshot. For example, a mesh may include a set of connected polygons used to describe a surface. Approximately planar surfaces may be identified from the mesh. A planar mesh may contain one or more holes. For example, a hole in a planar mesh may be a non-planar area, and/or an actual hole in the surface. Holes are optionally represented as closed polygons.

In some embodiments, the device may find 106 edges of one or more surface in the domain. Unless otherwise stated, an edge may be defined as the meeting place of shapes (e.g. planes) fit to a pair of physical surfaces and/or a corner may be defined as the meeting place of three fit shapes. Alternatively or additionally, an edge may be defined as a line (optionally the line may be straight and/or curved) along which a normal to the surface changes suddenly. Unless otherwise stated the edge is a feature that continues at least 1/10 the length of the current FOV and/or the sudden change is defined as a change of at least 60 degrees over a distance of less than 5 mm. Alternatively or additionally, the line may be required to be straight (e.g. not change direction more than 5 degrees inside the FOV). Alternatively or additionally, the edge may be a feature that continues at least 1/100 the length of the FOV and/or 1/20 and/or 1/5 and/or 1/3 the length and/or at least 1 mm and/or at least 1 cm and/or at least 10 cm and/or at least 100 cm. Alternatively or additionally, the sudden change may be defined as a change of angle of the normal of at least 30 degrees over a distance of a less than 5 cm. Alternatively or additionally the change in angle may be defined as greater than 10 degrees and/or greater than 60 degrees and/or greater than 85 degrees and/or between 85 to 95 degrees and/or between 88 to 92 degrees and/or greater that 95 degrees and/or greater than 120 degrees and greater than 150 degrees. Optionally the distance may be over less than 1 mm and/or over between 1 to 5 mm and/or over 5 mm to 1 cm and/or between 1 to 5 cm and/or between 5 to 25 cm.

In some embodiments, a corner may be defined as a meeting of three edges in a volume of radius less than 10 mm each edge leading out of the volume at an angle differing from each other edge by at least 30 degrees. Alternatively or additionally, the corner may be defined within a volume of radius of less than 1 mm and/or less than 1 cm and/or less than 10 cm there are at least three edges leading out of the volume at angles differing by at least 10 degrees and/or at least 30 degrees and/or at least 60 degrees and/or at least 80 degrees and/or at least 85 degrees. Alternatively or additionally, a corner may be defined as a meeting of three planar surfaces. For example, the within a volume of radius of less than 1 mm and/or less than 1 cm and/or less than 10 cm there are at least three planar surface having normals at angles differing by at least 10 degrees and/or at least 30 degrees and/or at least 60 degrees and/or at least 80 degrees and/or at least 85 degrees, each surface having a surface area of at least the radius of the circular volume squared and divided by 4 and/or divided by 8 and/or divided by 12 and/or divided by 16.

In some embodiments, edges may be defined to close 108 the perimeter of a surface. For example, a perimeter of a surface may be defined as a polygon having approximately straight edges and/or corners. Optionally, a domain may be modeled 112, for example, by segmenting objects. For example, segmenting may include differentiating between discrete objects and/or defining the objects. For example, a planar surface at a lower portion of domain and/or having a normal that is vertically upward may be defined as a floor and/or a planar surface having a normal that is horizontal may be defined as a wall. For example, a pillar may be defined by its closed edge on a floor and/or a on a ceiling and/or its height and/or its vertical sides.

Figure 2:
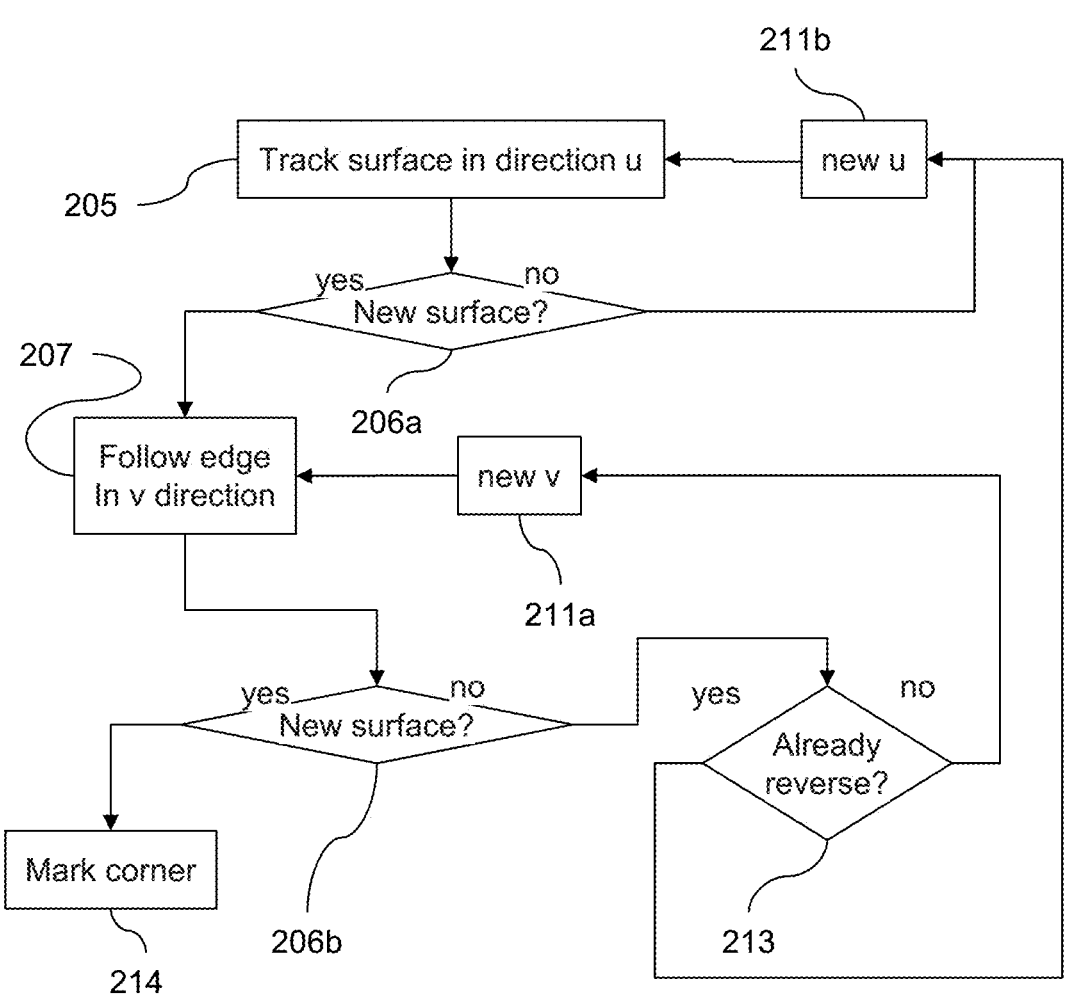
FIG. 2 is a flow chart illustration of a method of finding an edge of a surface in accordance with an embodiment of the current invention.

FIG. 2 is a flow chart illustration of a method of searching for a corner of a surface in accordance with an embodiment of the current invention. For example, once a device has selected a surface, a sensor may track 205 along the surface in a defined direction "u" (optionally tracking may including moving the entire device along the surface and/or moving the sensor with respect to the device and/or my directing the field of view of the sensor without actually moving the sensor). Tracking 205 may continue until a stop condition is reached (e.g. a stop condition may include an edge of a fit shape and/or a change beyond some threshold value in the angle of a normal to the surface for example the threshold value may be 10% and/or 30% and/or 60% and/or 85% and/or 90%). At the stop location the device optionally takes a new snapshot and/or checks 206a the snapshot includes a new surface (e.g. if an edge of the surface has been reached). For example, an edge of a planar surface may be defined as a location where a new plane (second plane, non-conforming to the first one) is present in the snapshot at a specified scale. If no such second plane exists, the device optionally selects 211b a new tracking direction (u) in the original plane and and/or re-starts tracking 205. If such a second plane exists, the device optionally selects a direction along the line intersection of the two planes and/or follows 207 the line until stop condition is reached. At a stop location, the system optionally takes a new snapshot and checks 206b a new surface has been reached (e.g. if a corner has been reached). For example, a corner may be defined as an intersection between the two surfaces defining the edge and a new surface (for example a third plane, non-conforming to the previous two). If no such third plane exists, the device may choose 211a a new direction (e.g. reverse direction (v=−v)) and track 207 along the line in the new direction until a stop condition is reached. At the new stop location, the device optionally takes a new snapshot. If still no such third plane exists, the device may select a new tracking direction (u) in the original plane and/or re-start tracking 205 along the surface in search of a new edge. If a third plane exists, the device optionally recognizes 214 the intersection of the 3 planes as a corner.

Figure 3A:
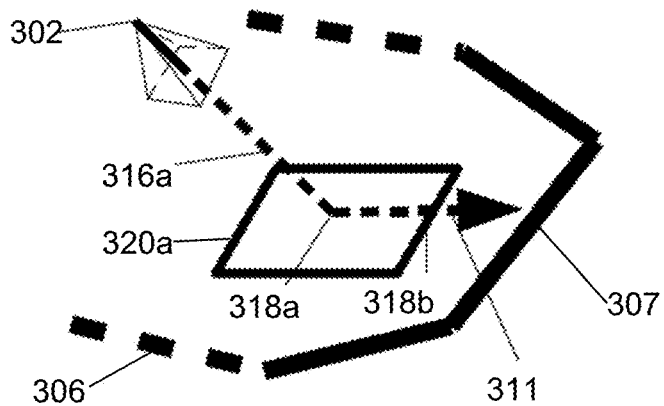
FIG. 3A is a schematic illustration of a stage in a method of finding an edge of a surface in accordance with an embodiment of the current invention.

FIG. 3A is a schematic illustration of a stage in a method of finding an edge of a surface in accordance with an embodiment of the current invention. In some embodiments a search is initialized by generating a mesh from a snap shot taken of an initial field of view FOV 320a including a central view point P0 318a on a line of sight LOS 316a. Optionally a surface (for example a plane) in the snapshot is selected and/or a tracking direction 311 (e.g. "u", unit vector) con- tained in the plane. Optionally, the FOV 320a of the sensor 302 is moved a step in the direction "u" (e.g. half the length of the FOV and/or ranging between 0 to 25% and/or between 25 to 75% and/or between 75% to 100% the length of the FOV). For example, sensor 302 is moved in the "u" direction 311 half the length of FOV 320a such that the center of the new FOV (320b see FIG. 3B) moves to point P1 318b on a new line of sight (e.g. LOS 316b see FIG. 3B).

Figure 3B:
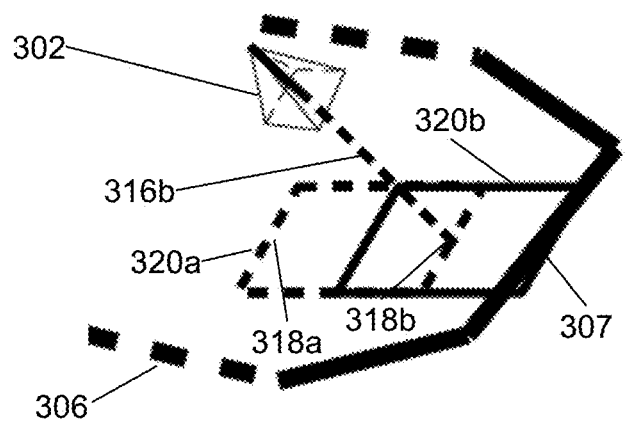
FIG. 3B is a schematic illustration of a subsequent stage in a method of finding an edge of a surface in accordance with an embodiment of the current invention.

FIG. 3B is a schematic illustration of a subsequent stage in a method of finding an edge of a surface in accordance with an embodiment of the current invention. In some embodiments, moving a FOV 320a to a new FOV 320b includes projecting mesh points along the vector "u" and/or by a chosen projection (p_max). For example, in FIG. 3B p_max was chosen as half the length of FOV 320a. Optionally the sensor's line of sight is directed from LOS 316a to LOS 316b and/or the central point of the FOV from p0 318a to p1 318b=p1+p_max·u, take a new snapshot, and/or generate a new mesh.

Figure 3C:
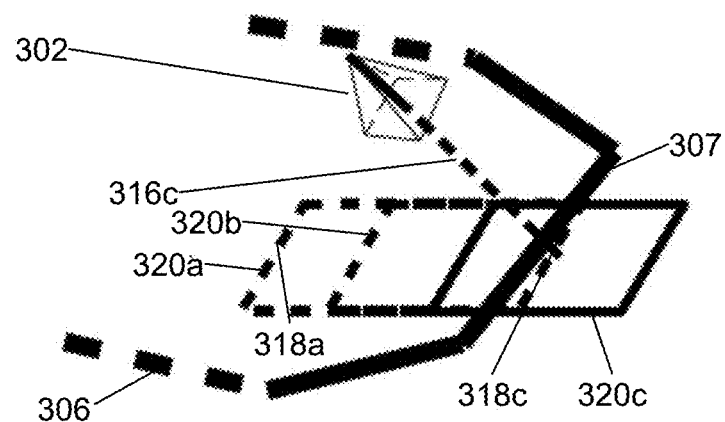
FIG. 3C is a schematic illustration of finding an edge of a surface in accordance with an embodiment of the current invention.

FIG. 3C is a schematic illustration of finding an edge of a surface in accordance with an embodiment of the current invention. Optionally, movement of the FOV of the sensor continues along the vector "u" 311 until an edge 307 is encountered. For example, FOV 320b is moved to a new FOV 320c including projecting mesh points along the vector "u" and/or a maximum projection (p_max). Optionally the sensor's line of sight is directed from LOS 316b to LOS 316c and/or the central point of the FOV from p1 318b to p2 318c=p2+p_max·u and/or a new snapshot is taken, and/or a new mesh is generated Optionally, the various views and/or meshes define and edge line 307 that defines part of the perimeter of the surface. Some parts of the edge 306 may not yet be known.

FIG. 4A is a schematic illustration of a stage in a method of finding a corner of a surface in accordance with an embodiment of the current invention. In FIG. 4A, sensor 302 is shown making a snap shot of a FOV 420a centered on a view point 418a on a LOS 416a. LOS 416a lies on an edge 407a at a junction between two surfaces 424a, 424b (e.g. defined in mesh). Optionally the surfaces are 424a, 424b approximately planar and/or the edge 407a is approximately linear. Other unexplored edges 406 are optionally left unexplored, for example for future tracking.

FIG. 4B is a schematic illustration of a subsequent stage in a method of finding a corner of a surface in accordance with an embodiment of the current invention. In some embodiments, the sensor 302 tracks along an edge 407a in search of a corner 422. For example, sensor 302 may be moved to sense down a line of sight 416b to a new view point 418b and/or a new FOV 420b.

FIG. 4C is a schematic illustration of finding a corner of a surface in accordance with an embodiment of the current invention. In some embodiments, the sensor 302 tracks along edge 407a in a selected direction until a stop condition is reached. For example, sensor 302 may be moved to sense down a line of sight 416c to a new view point 418c and/or a new FOV 420c. For example, FOV 420c includes a third surface 424c and/or further edges where 407b and 407a where surface 424a and 424b respective intersect surface 424c. Optionally, the presence of a new surface 424c is a stop condition. The system then determines that there is a corner 422 where all three surfaces 424a, 424b and 424c converge and marks 422 as a corner.

FIG. 5 is a flow chart illustration of a method of finding a polygon perimeter of a surface in accordance with an embodiment of the current invention. For example, starting 520 with a defined corner, a surface intersecting the corner is chosen 504. Optionally, an edge of the selected surface originating in the detected corner is selected 511a and/or tracked 507 until a stop condition is reached. The stop location is optionally checked 506 for the presence of a corner. For example, at the stop location, a new snapshot is taken and/or meshed to check if a new, conforming corner is present (e.g. a corner with one line conforming to the direction of arrival). When such new corner exists, the location is checked 526 if it is one of the previous corners (e.g. the original corner of the surface), if it is one of the previous corners, then the polygon is optionally determined to be closed 528. If not, the system may select 511b a new edge for tracking 507 from the new corner (e.g. an edge which is not parallel to the direction of arrival and/or is perpendicular to the surface normal). Optionally the system continues until a stop condition is reached and/or until the polygon is determined to be closed 528.

In some embodiments, a stop condition will be reached where a corner is not detected. Optionally, at such a stop position, the system checks 530 if the tracked line is obscured. Optionally, the sensor is moved toward 532 the stopping point while staying behind it, until a corner is found at some scale. If the line is not obscured, the sensor is optionally moved along the tracked line past 534 the stopping point, and/or a new FOV is used to take 534 a snapshot looking backwards at the stopping point.

Figure 6A:
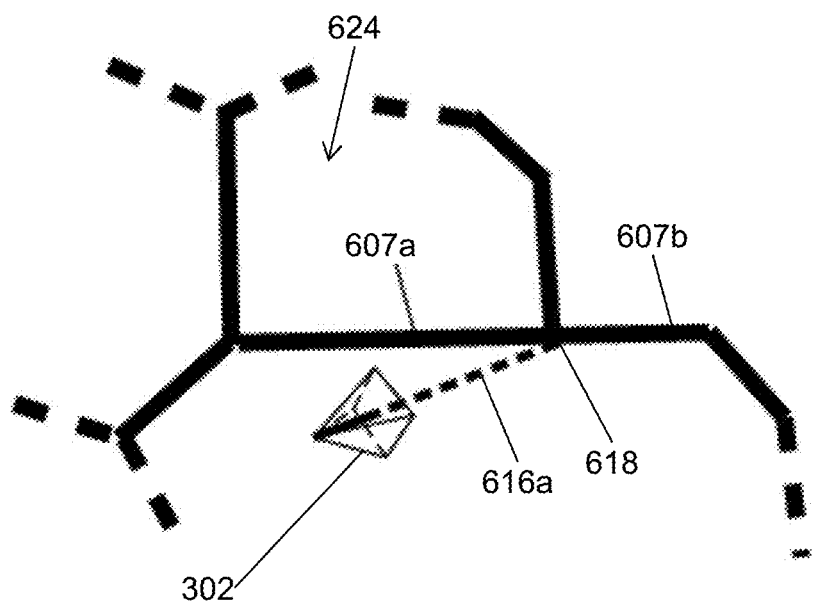
FIG. 6A is a schematic illustration of a stage in a method of defining a corner of a surface in accordance with an embodiment of the current invention.

FIG. 6A is a schematic illustration of a stage in a method of defining a corner of a surface in accordance with an embodiment of the current invention. For example, a sensor may track a line 607a and/or reach a stop position 618 (e.g. where a normal of a surface 624 changes). Nevertheless, from the LOS 616a of the sensor 302 the edge 607a may appear to continue in a section past 607b the stop position 618.

Figure 6B:
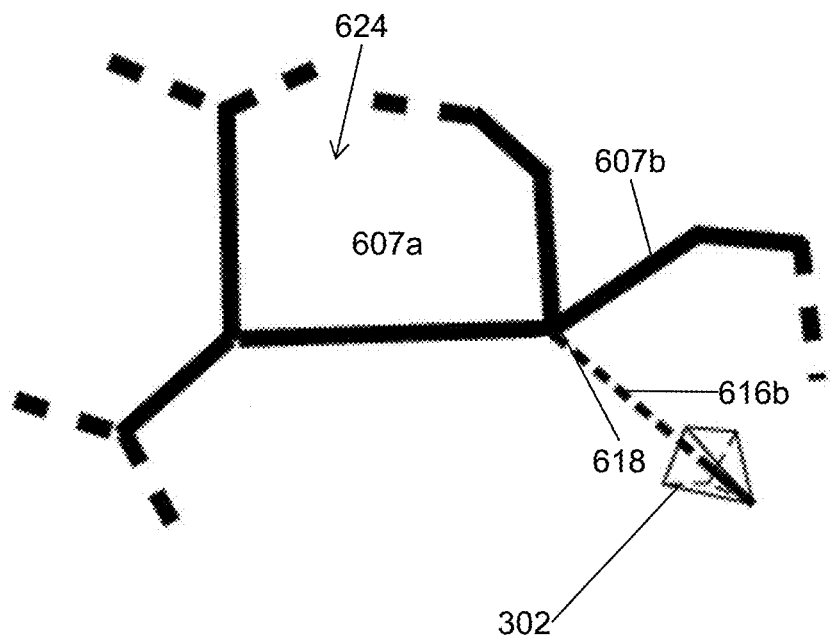
FIG. 6B is a schematic illustration of a subsequent stage in a method of defining a corner of a surface in accordance with an embodiment of the current invention.

FIG. 6B is a schematic illustration of a subsequent stage in a method of defining a corner of a surface in accordance with an embodiment of the current invention. Optionally, when a line 607 seems to continue past a stop location 618 the sensor 302 is moved to new vantage point giving a new LOS 616b. For example, beyond the stop location 628 position (e.g. on the other side of the stop point from the previous vantage point). For example, from the new vantage point, it may become clear that there is a new surface and/or a 3D redirection of the edge section 607b.

Figure 7A:
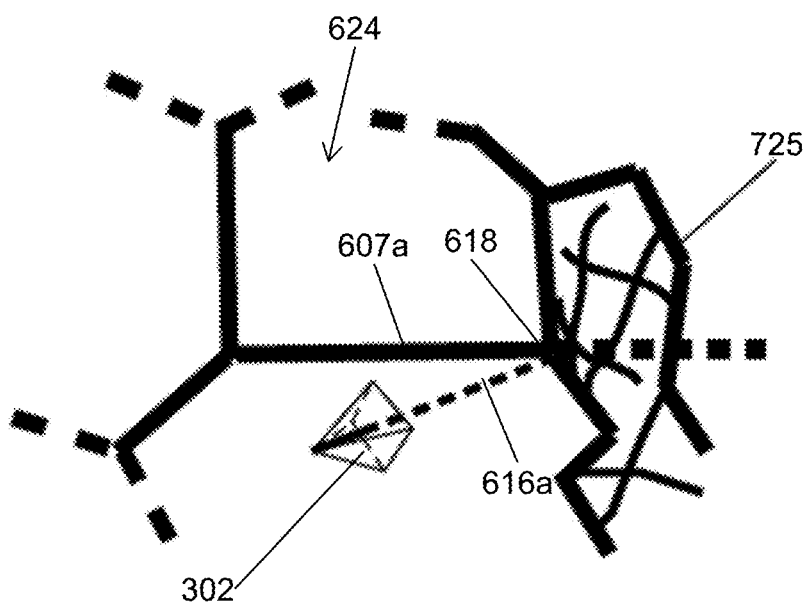
FIG. 7A is a schematic illustration of a stage in a method of defining an obscured corner of a surface in accordance with an embodiment of the current invention.

FIG. 7A is a schematic illustration of a stage in a method of defining an obscured corner of a surface in accordance with an embodiment of the current invention. In some cases, at a stop location 618 a system may not find a corner and/or also my not find a continuation of the tracked line 607a. For example, there may be a non-planar surface 725 that does not define a clear corner. Optionally, in such a case, a sensor 302 may be brought closer to the stop position 618 (optionally staying on the same side of the stop position 618). For example, a new snapshot may be made from a new LOS 616b.

Figure 7B:
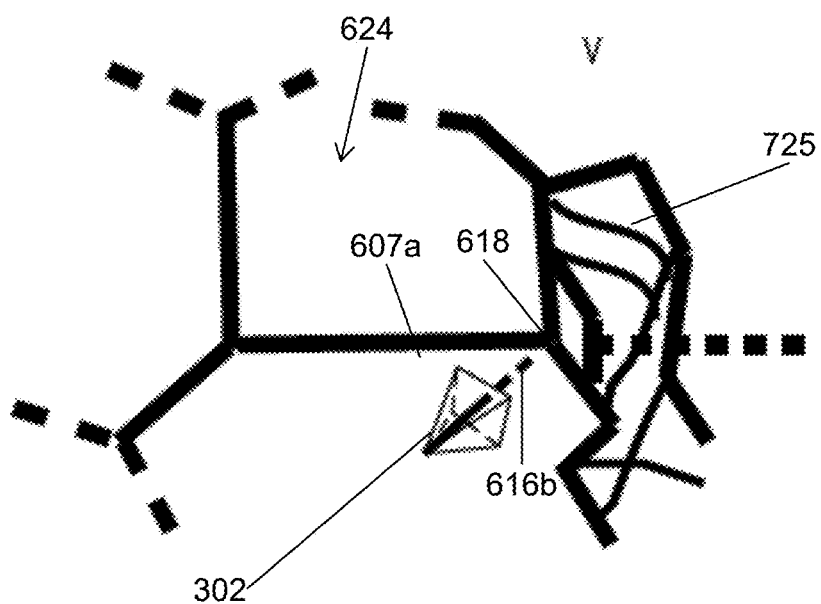
FIG. 7B is a schematic illustration of a subsequent stage in a method of defining an obscured corner of a surface in accordance with an embodiment of the current invention.

FIG. 7B is a schematic illustration of a subsequent stage in a method of defining an obscured corner of a surface in accordance with an embodiment of the current invention. For example, at a closer range along LOS 616b, a smaller FOV may be defined. At the smaller scale, a cleaner surface (e.g. an approximately planar surface 724 may be defined and/or on that scale, the stop point may be defined and/or marked as a corner.

Figure 8A:
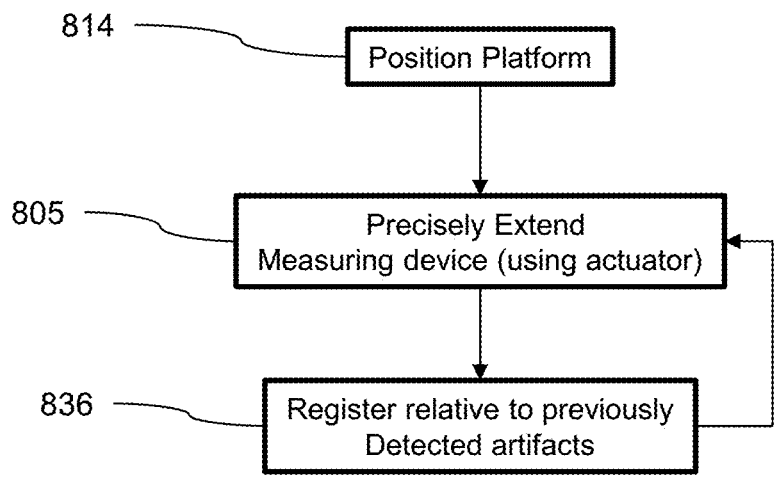
FIG. 8A is a flow chart illustration of a method of measuring a domain in accordance with an embodiment of the present invention.
Figure 8B:
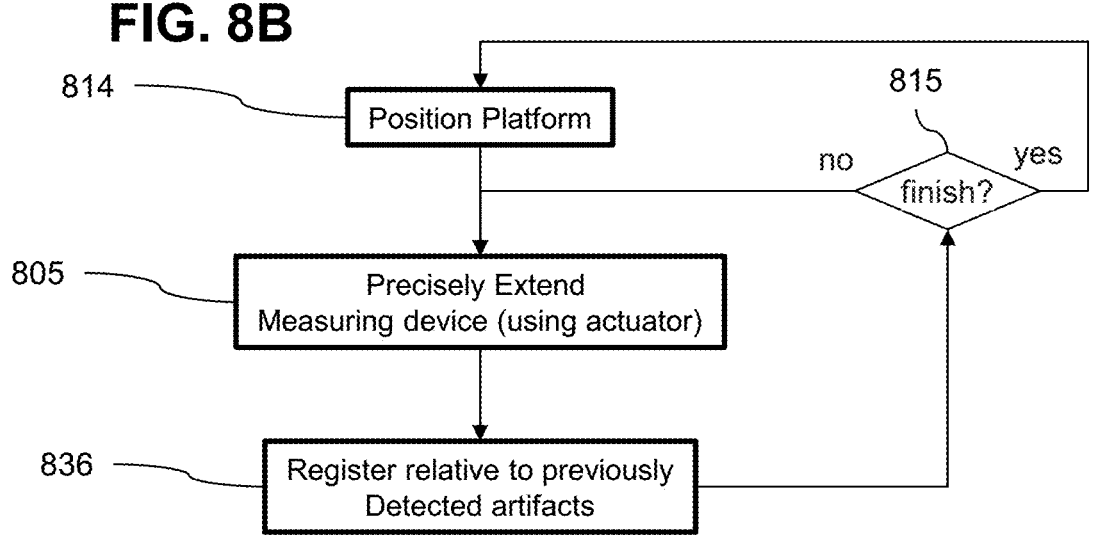
FIG. 8B is a flow chart illustration of a method of repeated measuring a domain in accordance with an embodiment of the present invention.

FIGS. 8A and 8B are flow chart illustrations of methods of measuring a domain in accordance with some embodiments of the present invention. In some embodiments, a mobile platform is positioned 814 in a location defined by a landmark (e.g. a detected artifact for example including a 3D feature) in or near the domain. Optionally the system will define the domain and/or a significant area while the platform remains stationary. For example, the platform may be positioned 814 in respect to a corner of a room. In some embodiment, the positioning of the platform may be at a relatively low precision (for example the location of the platform may be defined to a tolerance of 100 mm and/or 10 mm and/or 1 mm and/or 0.1 mm) or for example the angular position of the platform may be defined within 10 degrees and/or 1 degree and/or 0.1 degree. Optionally, the platform includes a position measuring device mounted on a high precision actuator (e.g. a robotic arm) for example the relative positional accuracy of the arm while the platform is stationary may be within 1 mm and/or 0.5 mm and/or 0.1 mm and/or within 0.05 mm and/or within 0.01 mm. The actuator is optionally used to extend 805 the measuring device to multiple measurement locations in the region of access of the actuator. The relationship between the measurement locations is optionally measured 836 and/or known at a significantly higher precision than the position of the platform and/or of the accuracy of the positioning device. For example, accuracy of relative positions of the arm may be at least 5 times and/or 10 times and/or 50 times and/or 100 times as accurate as the relative positions of the platform and/or the accuracy of the poisoning device. Optionally, the platform may be moved to another location and/or scanning of the domain may continue using the measuring device, moved precisely between measurement positions using the actuator. Optionally, after finishing 815 measurements around one position of the platform and/or actuator may be moved to a new position 814. Optionally, the old and new positions are selected such that measurements made from different positions of the platform overlap. The overlap optionally facilitates accurate integrating of measurements between different positions.

Figure 9A:
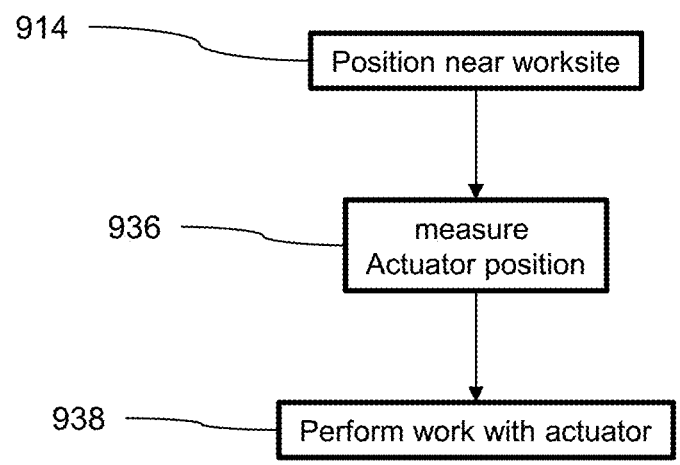
FIG. 9A is a flow chart illustration of a method of working in accordance with an embodiment of the present invention.
Figure 9B:
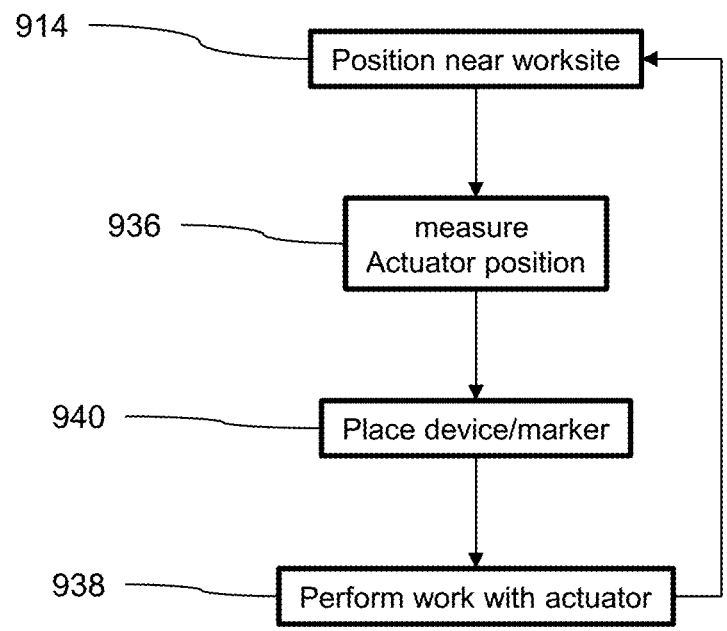
FIG. 9B is a flow chart illustration of a method of repeated working in accordance with an embodiment of the present invention.

FIGS. 9A and 9B are flow chart illustrations of a robotic system acting in a domain in accordance with some embodiments of the present invention. In some embodiments, a mobile robotic system may perform 938 actions at a high level of spatial accuracy within a domain. For example, the system may build a wall and/or plaster a wall and/or paint a wall and/or position permanent and/or temporary structures. In some cases, it is desired to achieve highly precise relative position and/or orientation between distant parts of an object and/or distant objects. In some cases, a system will perform 938 some task that entail traveling in a closed circuit over a large domain and there will be a desire that the position at the end of the circuit remain precisely synchronized with the position at the beginning of the circuit. In some cases, it will be very difficult to control the position of a mobile platform to a high precision. Optionally, the platform will be positioned 914 near a worksite and/or an actuator (e.g. a robotic arm) mounted on the platform will measure 936 its location with a high level of precision. Optionally, the arm will then perform work and/or move tools. For example, performing work 938 may include the arm may build and/or renovate internal spaces and/or place 940 markers for people and/or other devices. In some embodiments, the robotic arm may place 940 a location measuring device and/or an active device and/or marker. For example, the marker and/or device may remain stable and serve as a guide while the device is performing work. For example, the arm may use a grasper and/or a mount to hold the measuring device while measuring position. Optionally, the arm may release the measuring device and/or use the grasper and/or mount to hold a tool while doing work. For example, while doing work, the precise location of the tool is known based on the knowledge of the initial position of the free end of the actuator and/or precise knowledge of the movement of the free end (e.g. with the platform and/or fixed end of the actuator being held immobile). Alternatively or additionally, the arm may be used to place 940 another robot precisely to perform functions independently. Alternatively or additionally, the actuator may have separate mounts for the measuring device and a tool. For example, while working with a tool, the measuring device may be tracking the position of the actuator. Alternatively or additionally, there may be a position for the measuring device on the platform and/or an alternative location on the actuator. For example, while the actuator is handling a tool with a mobile mount used for measuring multiple location with the measuring device, the measuring device may also measure a position of the actuator and/or the platform, but not from its mobile mount on the actuator. In some embodiments, a position measuring device may include a lidar (laser range finder), a time of flight measuring device, 2D/3D cameras, an IMU (inertial measurement unit) and/or a 3-stroke sensor (e.g. force and torque sensor).

Figure 10:
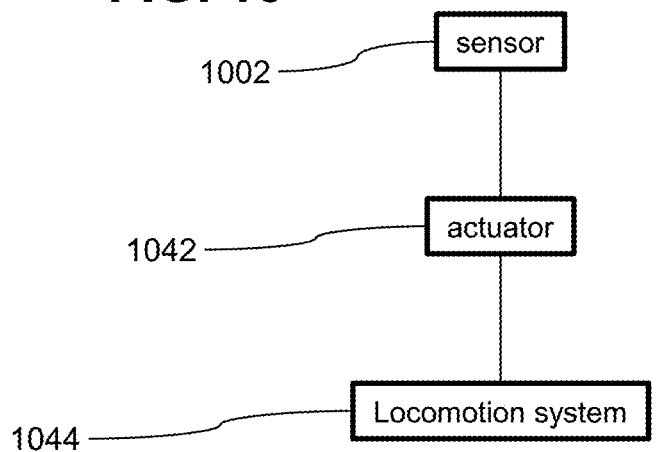
FIG. 10 is a block diagram of a domain mapping system in accordance with an embodiment of the current invention.

FIG. 10 is a block diagram of a domain mapping system in accordance with an embodiment of the current invention. Especially when the floor is not flat and/or when there is a lack of clear fixed signs and/or a room is undergoing renovation, it may become very difficult to achieve precise location and/or locomotion of the underlying platform. In some embodiments, a platform will be positioned near a work site and/or an actuator 1042 mounted on the platform will be located to a higher precision than the platform and/or independent of the platform (for example, using a sensor 1002 [e.g. a location measuring device] mounted to the robotic arm 1042). Optionally the sensor 1002 is held in a mount and/or a robotic hand (e.g. a gripper). For example, the sensor 1002 may be moved with high precision in 1, 2, 3, 4, 5 or 6 degrees of freedom (e.g. 3 directions of movement and/or three axes of rotation).

In some embodiments, the platform includes a locomotion system 1044 configured to move the platform over uneven terrain (for example rubber wheels and/or tracks). Alternatively or additionally, the locomotion system 1044 will include a system to move with relatively high precision (for example rigid wheels [e.g. steel wheels for rolling along a smooth track]). Alternatively or additionally, the locomotion system 1044 will include an anchor to hold the actuator steady when the platform is not traveling (for example similar to a stabilizer and/or outrigger of a mobile crane).

In some embodiments, the system of FIG. 10 may perform the methods described in FIGS. 1 to 9B.

In some embodiments a robot is configured to navigate in indoor spaces and/or construction sites. Unless otherwise stated this means that the robot is small enough to pass through a door of 2.2 m by 60 cm on its own locomotion. Alternatively or additionally, the robot may be configured to pass through a door of height less than 1.5 m and/or less than 2 m and/or less than 2.5 m and/or less than 3 m and/or of width less that 40 cm and/or less than 80 cm and/or less than 120 cm and/or less than 2 m. Unless otherwise stated a robot configured to autonomously navigate indoor spaces and/or construction sites includes sensors to detect and/or avoid objects of volume greater than 9 cubic mm in its path will traveling. Alternatively and/or additionally, it may detect object of 1 and/or 5 and/or 50 and/or 100 cubic mm. Unless otherwise stated a robot configured to navigate indoor spaces and/or construction sites is configured to pass over obstacles of height up to 5 mm. Alternatively or additionally, a robot configured to navigate indoor spaces and/or construction sites may be configured to pass over obstacles of height up to 1 mm and/or 10 mm and/or 20 mm and/or 40 mm. Unless otherwise stated a robot configured to navigate indoor spaces and/or construction sites is configured to turn 90 degrees in a square of side length 1 m. Alternately or additionally, a robot configured to navigate indoor spaces and/or construction sites is configured to turn 90 degrees in a square of side length 0.5 m and/or 0.8 m and/or 2 m and/or 4 m.

Figure 11:
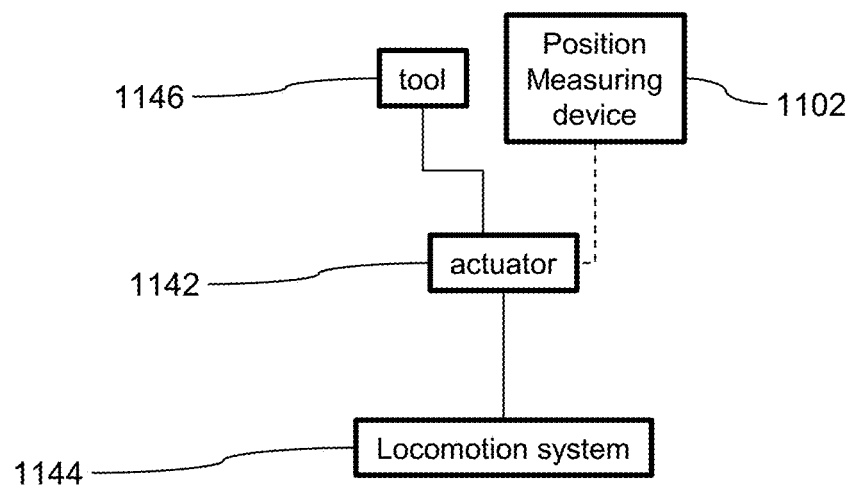
FIG. 11 is a block diagram of a mobile robotic system in accordance with an embodiment of the current invention.

FIG. 11 is a block diagram of a mobile robotic system in accordance with an embodiment of the current invention. In some embodiments, a robot will have a be configured to position a free end of an actuator 1142 at a high level of precision. For example, a sensor (e.g. a measuring device 1102) may be attached to and/or held by a free end of the actuator 1142. The actuator 1142 may use the measuring device 1102 to determine the precise position of the free end of the actuator 1142. Optionally, the actuator 1142 is configured for high precision movement. For example, after measuring the position of the actuator 1142, the actuator 1142 may be used for moving objects to precise location and/or performing work such as building and/or renovating a room.

In some embodiments, the actuator 1142 includes a robotic arm that is used to perform actions at a high level of locational precision. For example, which the work is being performed, the platform may be held steady. Optionally, there may be high precision map of a domain (for example the map is produced using methods described in embodiments herein). The sensor on the arm may define the location of the arm in accordance to the map and/or the output of the location sensor. For example, the actuator may move the measuring device 1102 with 1, 2, 3, 4, 5 and/or 6 degrees of freedom (e.g. 3 directions of translation and/or 3 directions of rotation).

In some embodiments, a device of FIG. 11 may perform methods such as described in previous figures. Optionally, there may be one mount/grasper to hold the measuring device 1102 and/or a tool 1146. For example, first the device may use the measuring device 1102 to measure the precise location of the actuator 1142. Then the measuring device 1102 may be put down. The mount/grasper that held the position measuring device 1102 may be used to hold and/or manipulate the tool 1146. Optionally, a lower precision locomotion system 1144 is used to move the platform around the domain. For example, after moving the platform, the position of the distal end of the actuator 1142 is measured, then the measuring device 1102 is put down and/or work starts. Positioning is optionally based on precise movements of the actuator 1142 and/or knowledge of the starting position. Alternatively or additionally, there may be mounts on the actuator for both the position sensor and/or the tool. While the tool is in use, the position sensor may be giving position data.

In some embodiments, the actuator 1142 includes a multidirectional mount and/or robotic hand to hold a tool 1146 and/or a measuring device 1102. Optionally, the actuator 1142 includes one mount and/or releases the measuring device 1102 while it is holding a tool 1146. Alternatively or additionally, the actuator 1142 includes multiple mounts and may measure location and/or work independently and/or simultaneously. Alternatively or additionally, the actuator includes one multidirectional mount and a second mount with fewer degrees of freedom. When the multidirectional mount is in use with a tool 1146, the measuring device 1102 may be positioned on the second mount with less freedom for example to measure the position and/or movement of the actuator 1142. Alternatively or additionally, there is a mount for the position measuring 1102 device on the platform to measure movement of the platform (e.g. make sure that the platform does not move while the arm is performing work). Alternatively or additionally, there is a mount for the position measuring device 1102 on the platform pointed toward the actuator to measure movement of the actuator relative to the platform.

In some embodiments a platform includes a locomotion system 1144 configured to move inside a construction site. For example, the system may be sized to fit through doors and/or overcome obstacles such as uneven terrain, steps, door frames etc. Optionally, the actuator 1142 will allow work and/or measurement over a large area (e.g. facility working without moving the platform often). For example, a robotic arm may move between 0 to 2 m and/or between 2 to 4 m and/or between 4 to 8 m. For example, the region of access of the actuator 1142 may include a semispherical domain above the platform having a radius of 2 m and/or of 4 m and/or 8 m.

In some embodiments, the system of FIG. 11 may perform the methods described in previous figures.

Figure 12:
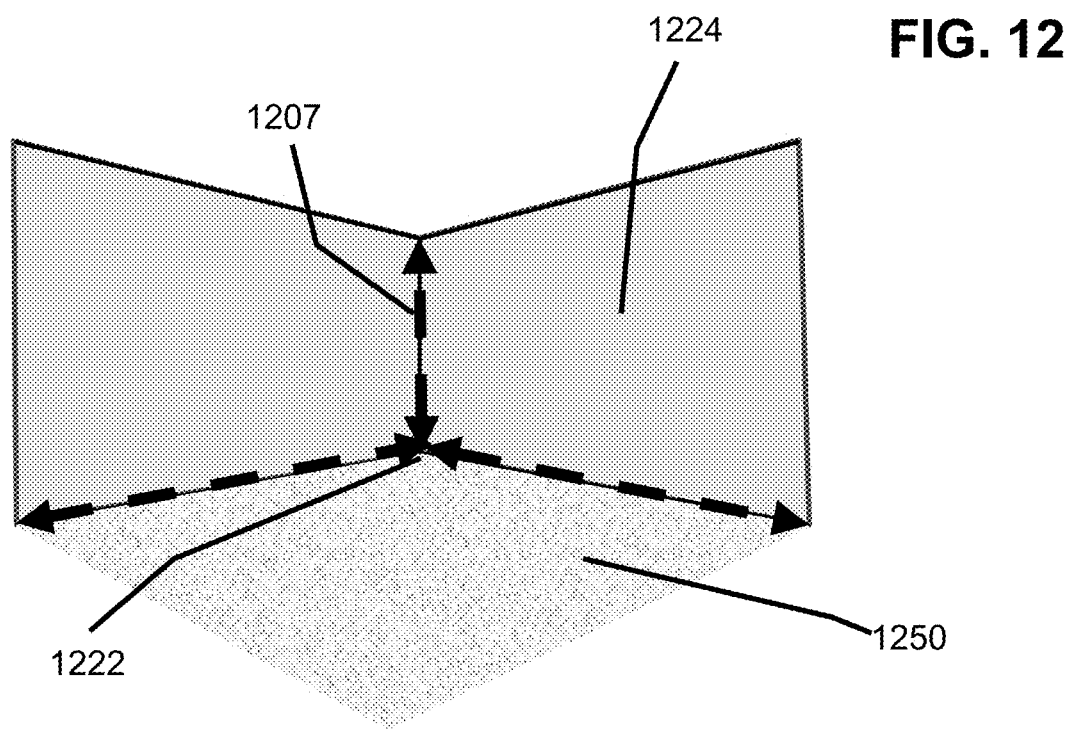
FIG. 12 is a schematic illustration of a room in accordance with an embodiment of the current invention.

FIG. 12 is a schematic illustration of a room in accordance with an embodiment of the current invention. In some embodiments a room under construction may have few landmarks and/or landmarks may rapidly change as construction continues. In some embodiments, this may make it difficult to build a model of the room and use landmarks and/or triangulation to navigate. In some cases, a floor 1250 is rough. In some embodiments, this may make it difficult to navigate precisely around the domain with a mobile platform and/or use SLAM methodologies for precise navigation. In some embodiments, of the current invention, a mobile device having an actuator capable of precise movement in a relatively large region of access is used to scan interconnected regions and/or coordinate navigation between these regions and/or act within and between these regions. Optionally, a corner 1222 of the room may serve as a landmark/artifact. Optionally, the floor 1250 and/or wall 1224 and/or ceiling and/or a junction between them (e.g. corner 1222) may serve as useful orientation indicators. In some embodiments, the actuator may be used to scan along various axes (i.e. edges 1207 that include for example junctions between the surfaces [e.g. between floor 1250 and walls 1224 and/or two walls 1224 and/or between a ceiling and a wall 1224) in and between regions of access.

In some embodiments, a position may be fixed (for example near a corner 1222). Optionally a mobile platform may include a precision industrial robotic arm and/or other high precision actuator. For example, the arm may allow precise movement with respect to the platform within a region of access. Optionally, this allows precise movement and/or mapping of the room from a few locations and/or precision reorientation of the arm after the platform has been moved. For example, while the platform remains stationary, a position measuring device can be moved precisely along a few axes, for example to map the domain and/or to perform tasks. When a task continues to a new region that is out of reach of the robotic arm (outside of the region of access of the arm), the platform may be moved to a new location wherein the robotic arm can reach at least part of the previous region of access. A measurement device mounted on the arm and/or returned to the previous region of access and measures its precise location with respect to the previous region of access. Optionally, the arm is now localized according to the previous location and/or acts in the new region of access in a way that it is coordinated at high precision to actions in the previous region of access.

Figure 13A:
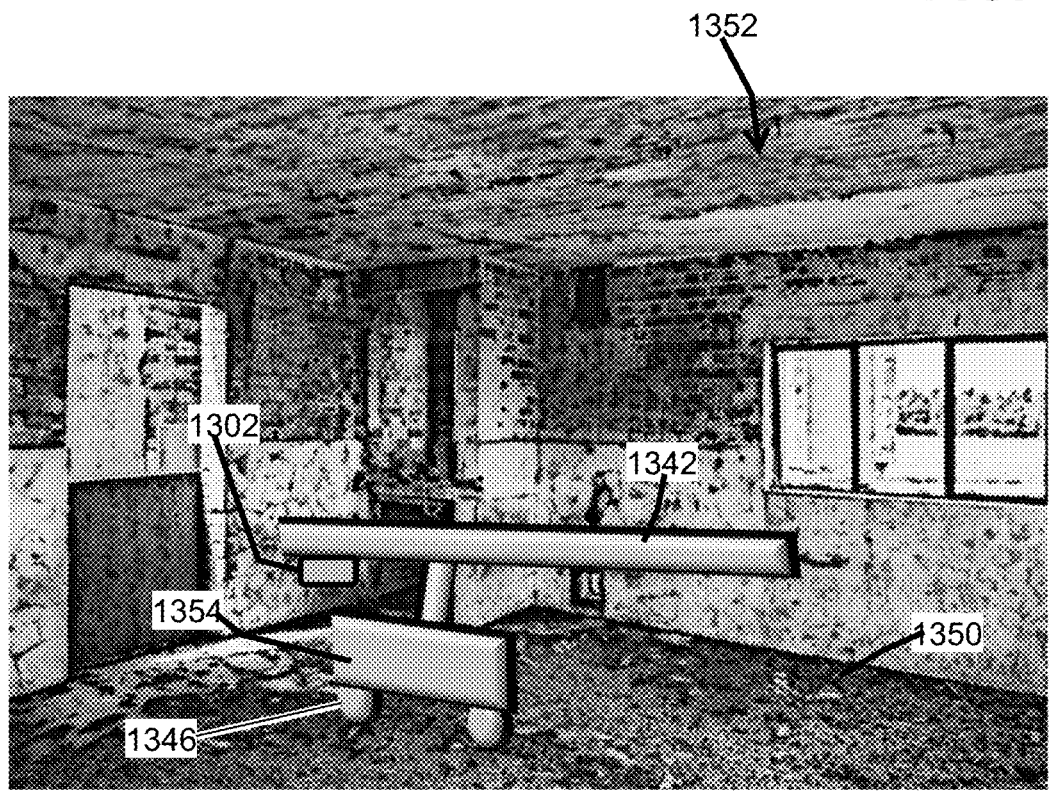
FIG. 13A is an image of a room with a robotic system in accordance with an embodiment of the current invention.

FIG. 13A is an image of a room 1352 with a system in accordance with an embodiment of the current invention. In some domains, it is difficult to sense and/or control movement. For example, if a platform were to move in closed route it may reach slightly different location than its starting point. This could lead to serious flaws when mapping a room and/or when building and/or finishing a room. In some embodiments, a system is supplied with a mobile platform 1354 and/or an actuator 1342 (for example a robotic arm). The platform 1354 is optionally kept stable and/or stationary while the arm is moved precisely to perform precise work and/or measurements within a region of access of the arm. Optionally, a position measuring device 1302 and/or tool is mounted on the arm in a variable orientation mount and/or can move along the arm. Optionally the actuator 1352 arm can move up and down and/or in different directions with respect to the platform 1354. This allows for precision scanning and/or actions within a region of access of the arm.

Figure 13B:
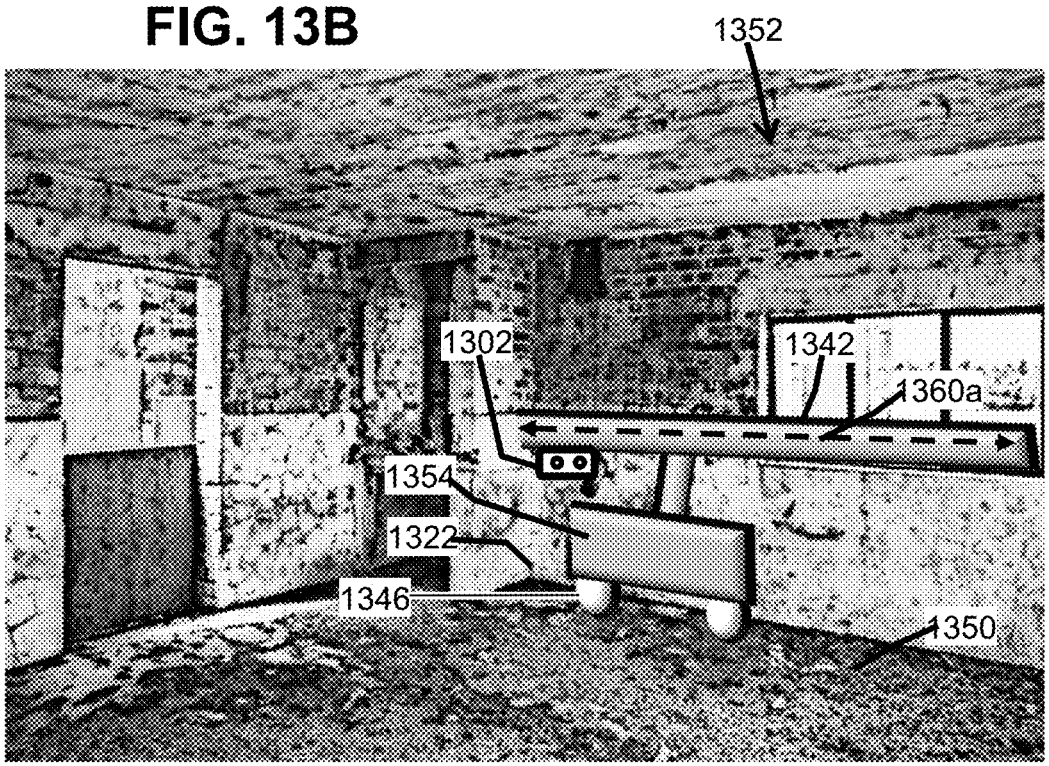
FIG. 13B is an illustration of scanning a room in a first direction with a measuring system in accordance with an embodiment of the current invention.

FIG. 6B is an illustration of scanning a room in a first direction from a first position with a measuring device 1302 in accordance with an embodiment of the current invention. For example, the platform 1354 has been positioned near a corner 1322 of the room 1352. In some embodiments, it may be possible to fix a location locally from the position and/or orientation of a junction between walls and/or a wall and a floor and/or a wall and a ceiling. From this position, an actuator is optionally used to scan and/or act to a high degree of locational precision within a region of access. Optionally, the arm is used to position a measuring device in various locations in the region of access and/or scan the region of access. Optionally, the region is scanned along a few axes (e.g. axes 1360a and 1360b as illustrated in FIGS. 13B and 13C).

Figure 13C:
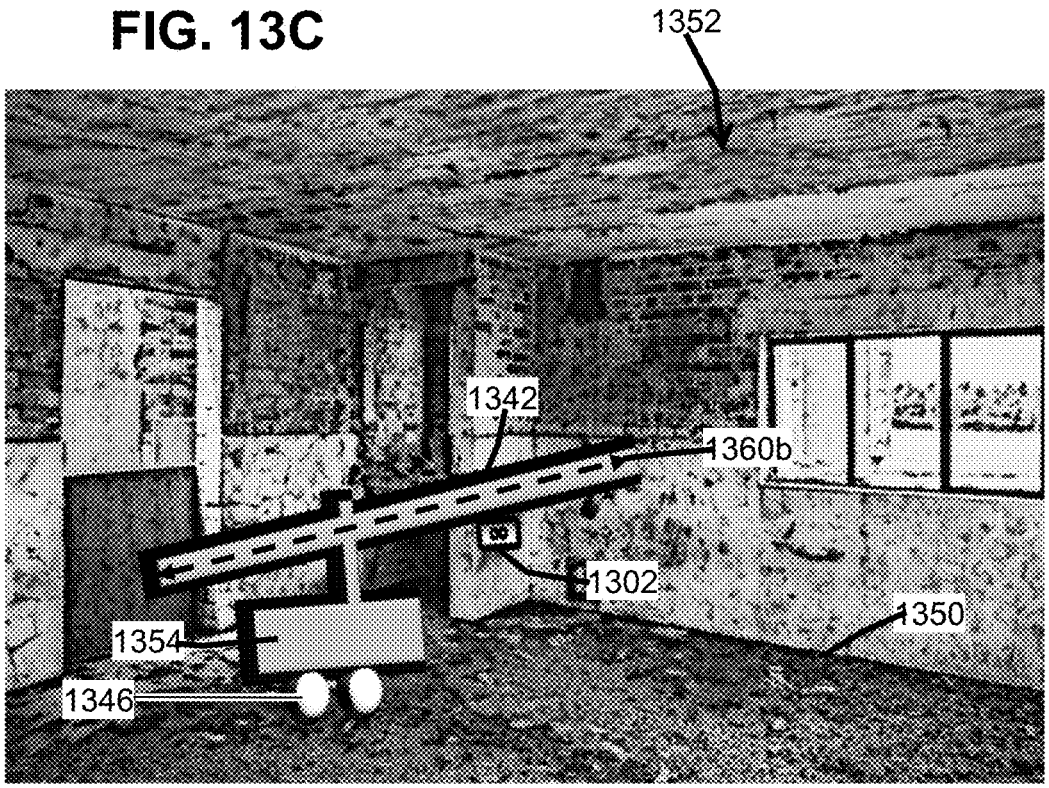
FIG. 13C is an illustration of scanning a room in a second direction with a measuring system in accordance with an embodiment of the current invention.

FIG. 13C is an illustration of scanning a room in a second direction from a second position with a measuring device 1302 in accordance with an embodiment of the current invention. Optionally, the region of access of the first position overlaps with the region of access of the second position. For example, this allow the platform 1354 in the second position, using the actuator 1342, to position a measuring device 1302 within the previous region of access and/or coordinate movement within the 2nd region of access to movement with the first region of access. For example, in this way, the system performs highly coordinated action across the domain.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

It is expected that during the life of a patent maturing from this application many relevant sensors, actuators etc. will be developed and the scope of the terms is intended to include all such new technologies a priori.

As used herein the term "about" refers to ±10% The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of mapping a space in an interior of a building comprising:
    positioning a 3D sensor assembly within the space;
    taking a first snapshot with the 3D sensor assembly of a field of view of the 3D sensor assembly, the snapshot including at least part of a first physical object;
    defining in said first snapshot a first surface fitting said first physical object;
    tracking said surface to a continuation of said surface beyond said field of view;
    taking a second snap shot of one or more physical objects at a location of said continuation with said 3D sensor assembly;
    searching said second snap shot for a first edge wherein said first surface makes a junction with at least a second surface fitting said one or more physical objects in said second snapshot.

2. The method of claim 1, wherein said first surface and said second surfaces are planar and said first edge is a line.

3. The method of claim 1, further comprising:
    meshing said first snapshot.

4. The method of claim 1, wherein said searching for a first edge includes:
    tracking along said first surface in a fixed direction and stopping at a stop location where a stop condition is encountered and
    testing if said stop location is an edge.

5. The method of claim 1, further comprising:
    closing perimeter of said first surface.

6. The method of claim 1, wherein said 3D sensor is mounted on a mobile platform configured for navigating the interior of a building, the method further comprising
    self propelling said mobile platform through a doorway into the space.

7. The method of claim 1, wherein said one or more physical objects include at least one of a wall, a floor and a ceiling of said interior of said building.

8. The method of claim 1, wherein said second snap shot is within a second field of view, the method further comprising:
    tracking said edge to a continuation of said edge beyond said second field of view;
    taking a third snap shot of one or more physical objects at a location of said continuation of said edge with said 3D sensor assembly;

searching said third snap shot for a corner wherein said first edge makes a junction with two other edges including a second edge between said first surface and a third surface fitting said one or more physical objects in said third snap shot and a third edge between said second surface and said third surface; and mapping the rest of the space in relation to said corner.

9. The method of claim 8, wherein said first surface and said second surface are planar and said first edge is a line.

10. The method of claim 3, wherein taking said first snapshot includes collecting a 3D point cloud within said field of view.

11. The method of claim 4, wherein said first surface is a plane and said stop condition includes the plane intersecting a second object.

12. The method of claim 4, wherein said testing includes finding an intersection between said first surface and a second object and defining a plane fitting said second object and wherein said edge includes an intersection between said plane and said first surface.

13. The method of claim 5, wherein said closing includes:

follow sequential edges of said first surface to return to a previous location.

14. The method of claim 5, wherein said closing includes:

repeatedly following a straight edge to a corner and follow new edge from said corner until a previous location is reached.

15. The method of claim 6, wherein said tracking includes moving said 3D sensor assembly along said surface by traversing with said mobile platform along a rough surface and avoiding an obstacle.

16. The method of claim 6, wherein said mobile platform includes a robotic arm including a movement tolerance of less than 0.25 mm and a reach of at least 3 m and wherein said tracking includes moving said 3D sensor assembly along said surface with said robotic arm while said mobile platform remains stationary.

17. The method of claim 8, where said searching for a corner includes:

following said first edge until a stop location wherein a stop condition occurs and searching for said corner at said stop location.

18. The method of claim 12, wherein said intersection is constrained to be a straight line.

19. The method of claim 17, wherein when said stop location is not a meeting of said first edge, said second edge and said third edge, the method further includes:

continuing to track said edge to a new location past said stop location and taking new snap shot of said stop location from said new location.

20. The method of claim 17, wherein when said stop location is not a meeting of three edges the method further includes:

approaching but not passing said stop location along said first edge and taking a new snap shot of said stop location.

\* \* \* \* \*